(12) United States Patent
Laan

(10) Patent No.: US 7,255,523 B2
(45) Date of Patent: Aug. 14, 2007

(54) DUAL THREADED SCREW FOR COMPOSITE MATERIALS

(75) Inventor: Cyril Laan, New Orleans, LA (US)

(73) Assignee: Prime Source Building Products, Inc., Jefferson, LA (US)

( * ) Notice: Subject to any disclaimer, the term of this patent is extended or adjusted under 35 U.S.C. 154(b) by 0 days.

(21) Appl. No.: 11/315,985

(22) Filed: Dec. 22, 2005

(65) Prior Publication Data

US 2007/0147973 A1    Jun. 28, 2007

(51) Int. Cl.
*F16B 35/00*    (2006.01)

(52) U.S. Cl. .................. 411/411; 411/412; 411/426

(58) Field of Classification Search ............... 411/411, 411/412, 413, 424, 426, 389
See application file for complete search history.

(56) References Cited

U.S. PATENT DOCUMENTS

| | | | |
|---|---|---|---|
| 33,487 A * | 10/1861 | Marsh .................. 411/334 |
| 34,691 A | 3/1862 | Monroe |
| 144,597 A | 11/1873 | Brackett |
| 154,864 A | 9/1874 | Harvey |
| 354,123 A | 12/1886 | Flynn |
| 408,531 A | 8/1889 | Rogers |
| 440,334 A | 11/1890 | Rogers |
| 470,804 A | 3/1892 | Jones |
| 471,179 A | 3/1892 | Jones |
| 684,774 A | 10/1901 | Baggs |
| 867,552 A | 10/1907 | Bradford et al. |
| 933,865 A | 9/1909 | Umholtz |
| 1,175,665 A | 3/1916 | Sweet |
| 1,953,095 A | 4/1934 | Baker |
| 1,980,093 A | 11/1934 | Rosenberg |
| 2,024,071 A | 12/1935 | Taylor et al. |
| 2,174,578 A * | 10/1939 | Graham ................ 411/412 |
| 2,199,809 A | 5/1940 | Pigott |
| 2,251,115 A * | 7/1941 | Crabbs .................. 200/327 |
| 2,292,557 A | 8/1942 | Wilson |
| 2,382,019 A | 8/1945 | Miller |
| 2,419,555 A | 4/1947 | Fator |
| 2,859,984 A | 11/1958 | Thomas |
| 3,093,025 A | 6/1963 | Wasserman |
| 3,124,408 A | 3/1964 | Oestereicher |
| 3,177,755 A | 4/1965 | Kahn |
| 3,256,661 A | 6/1966 | Fischer |
| 3,295,404 A | 1/1967 | Baker |
| 3,478,639 A | 11/1969 | Gruca |
| 3,524,378 A | 8/1970 | Wieber |

(Continued)

FOREIGN PATENT DOCUMENTS

CH    670 125    5/1989

(Continued)

*Primary Examiner*—Flemming Saether
(74) *Attorney, Agent, or Firm*—Fulbright & Jaworski LLP

(57) ABSTRACT

An improved dual threaded fastener for composite materials having a head and a shaft. The head is affixed to one end of the shaft and the shaft includes a point at its other end. The shaft includes an upper threaded portion and an upper threaded portion. The diameter of the shaft within the lower threaded portion is greater than the diameter of the shaft within the upper threaded portion. In this manner, as the fastener is rotated within the workpiece, producing remnants may be stored in the area surrounding the upper threaded portion.

18 Claims, 2 Drawing Sheets

U.S. PATENT DOCUMENTS

| | | |
|---|---|---|
| 3,537,288 A | 11/1970 | Ansingh |
| 3,661,046 A | 5/1972 | Waud et al. |
| 3,682,507 A | 8/1972 | Waud |
| 3,703,843 A | 11/1972 | Laverty |
| 3,717,067 A | 2/1973 | Vick et al. |
| 3,849,887 A | 11/1974 | Brainin |
| 3,861,269 A | 1/1975 | Laverty |
| 4,034,641 A | 7/1977 | Williams, Jr. et al. |
| 4,096,901 A | 6/1978 | Reichenbach |
| 4,175,555 A | 11/1979 | Herbert |
| 4,179,976 A | 12/1979 | Sygnator |
| 4,194,430 A | 3/1980 | Muenchinger |
| 4,233,878 A | 11/1980 | McGauran et al. |
| 4,258,607 A | 3/1981 | McKewan |
| D260,525 S | 9/1981 | Lassiter |
| 4,310,272 A | 1/1982 | Rich et al. |
| 4,376,332 A * | 3/1983 | Sandefur ................. 29/402.08 |
| 4,463,753 A | 8/1984 | Gustilo |
| 4,486,134 A | 12/1984 | White |
| 4,621,963 A | 11/1986 | Reinwall |
| 4,653,244 A | 3/1987 | Farrell |
| 4,742,663 A * | 5/1988 | Demers ..................... 52/726.1 |
| 4,808,051 A | 2/1989 | Gietl |
| 4,844,676 A | 7/1989 | Adamek |
| 4,854,311 A * | 8/1989 | Steffee ......................... 606/66 |
| 4,874,278 A | 10/1989 | Kawashita |
| 4,878,793 A | 11/1989 | Hewison |
| 4,900,208 A | 2/1990 | Kaiser et al. |
| 4,959,938 A | 10/1990 | De Caro |
| 5,019,079 A | 5/1991 | Ross |
| 5,020,954 A | 6/1991 | Dreger |
| 5,108,227 A | 4/1992 | Bergey |
| 5,203,657 A | 4/1993 | Nagoshi et al. |
| 5,222,954 A * | 6/1993 | Baker et al. ................... 606/61 |
| 5,236,438 A | 8/1993 | Wilk |
| 5,259,398 A | 11/1993 | Vrespa |
| D347,383 S | 5/1994 | Carruthers |
| D347,786 S | 6/1994 | Carruthers |
| 5,379,505 A | 1/1995 | Reed |
| 5,433,570 A | 7/1995 | Köppel |
| 5,499,892 A | 3/1996 | Reed |
| 5,531,553 A * | 7/1996 | Bickford ..................... 411/389 |
| 5,531,554 A | 7/1996 | Jeanson et al. |
| 5,536,127 A | 7/1996 | Pennig |
| 5,601,553 A | 2/1997 | Trebing et al. |
| 5,735,653 A | 4/1998 | Schiefer et al. |
| 5,746,039 A | 5/1998 | Nystrom |
| 5,800,107 A * | 9/1998 | Giannuzzi et al. .......... 411/386 |
| 5,816,012 A | 10/1998 | Willis |
| 5,863,167 A | 1/1999 | Kaneko |
| 5,865,584 A | 2/1999 | Onofrio |
| 5,890,842 A | 4/1999 | Dahill |
| 5,909,992 A | 6/1999 | Wu |
| 6,000,892 A * | 12/1999 | Takasaki ..................... 411/413 |
| 6,022,177 A | 2/2000 | Hofer |
| 6,030,162 A | 2/2000 | Huebner |
| 6,045,312 A | 4/2000 | Hsing |
| 6,050,765 A | 4/2000 | McGovern et al. |
| 6,074,149 A | 6/2000 | Habermehl et al. |
| 6,080,156 A * | 6/2000 | Asher et al. ................... 606/61 |
| 6,086,303 A | 7/2000 | Flückiger |
| 6,325,583 B1 | 12/2001 | Mattle et al. |
| 6,616,391 B1 | 9/2003 | Druschel |
| 6,666,638 B2 | 12/2003 | Craven |
| 6,918,727 B2 * | 7/2005 | Huang ....................... 411/389 |
| 6,941,635 B2 | 9/2005 | Craven |
| 6,966,737 B2 | 11/2005 | McGovern et al. |
| 2003/0059277 A1 | 3/2003 | O'Berry |
| 2004/0141827 A1 | 7/2004 | Dicke |

FOREIGN PATENT DOCUMENTS

| | | |
|---|---|---|
| EP | 0 012 441 | 6/1980 |
| EP | 0 090 453 | 10/1983 |
| EP | 0 129 404 | 12/1984 |
| EP | 0 313 927 | 5/1989 |
| EP | 0 314 950 | 5/1989 |
| FR | 2 713 291 | 6/1995 |
| GB | 1 277 044 | 6/1972 |
| GB | 2 169 051 | 7/1986 |
| GB | 2 251 666 | 7/1992 |
| IT | 598490 | 10/1959 |
| WO | WO-97/26460 | 7/1997 |
| WO | WO-01/06135 | 1/2001 |

* cited by examiner

DUAL THREADED SCREW FOR COMPOSITE MATERIALS

FIELD OF THE INVENTION

The present invention relates generally to fasteners suitable for securing workpieces. More particularly, the present invention relates to a dual threaded screw suitable for use with composite materials.

BACKGROUND OF THE INVENTION

When conventional screws are inserted into materials, remnants or shavings can be produced that are displaced toward the top of the screw insertion point. The remnants can remain on the surface of the material at or near the screw insertion point, requiring removal by sanding or other methods. Remnants and otherwise displaced composite material may also result in "mushrooming," where a mound or bump of raised material surrounds the perimeter of the screw head. The mushroom then must be hammered or forced back down to maintain a flush surface.

Although pre-drilling holes for the screw may reduce remnants on the surface and/or mushrooming, this technique is laborious and time-consuming.

Several patents disclose dual threaded screws for securing a workpiece. For instance, U.S. Pat. No. 6,666,638, issued to Craven, discloses a deck screw having multiple threaded sections. The upper threaded portion has a thread pitch that is lesser than the lower threaded portion and the upper threaded portion has an outer thread diameter that is greater than the outer diameter of the lower threaded portion.

U.S. Pat. No. 6,966,737, issued to McGovern, discloses a deck screw suitable for use with composite lumber having an upper threaded portion and a lower threaded portion. The shaft in the upper threaded portion has a larger diameter than the shaft in the lower threaded portion, and the upper threaded portion has more threads per unit length than the lower threaded portion.

U.S. Pat. No. 6,000,892, issued to Takasaki, discloses a wood screw having an upper threaded portion and a lower threaded portion. The upper threaded portion has a thread angle greater than that of the lower threaded portion, and the upper threaded portion has a lead angle smaller than the lower threaded portion.

U.S. patent application Ser. No. 2004/0141827 discloses a self-tapping screw for composite materials having an upper threaded portion and a lower threaded portion separated by a thread-free section. The threads of the upper threaded portion have an opposite pitch from the lower threaded portion.

U.S. Pat. No. 6,074,149, issued to Habermehl et al., discloses a threaded fastener with an upper threaded portion and a lower threaded portion. The lower threaded portion has threads of a larger size and greater cross-sectional area than the threads of the upper threaded portion.

While these configurations have their benefits, the need exists for an improved dual threaded screw or fastener having enhanced performance yet providing maximum opportunity for retaining remnant material below the surface of the workpiece.

BRIEF SUMMARY OF THE INVENTION

The present invention relates to a fastener which minimizes the production of remnant producing material above the surface of the workpiece. The fastener or screw of the present invention has a head and a shaft. The shaft is attached to the head at one end and includes a point at its other end. The shaft also includes an upper threaded portion proximate the head and a lower threaded portion proximate the point. The diameter of the shaft at the lower threaded portion is larger than the diameter of the shaft of the upper threaded portion. In this manner, as remnant materials are produced by the lower threaded portion, more space exists between the bore of the workpiece and the upper threaded portion to accommodate remnants while the screw is being rotated within the composite material. The upper threaded portion has a major diameter or outer thread diameter that is generally smaller than the major diameter or outer thread diameter of the lower portion. Additionally, the thread angle of the lower threaded portion is smaller than the thread angle of the upper threaded portion. Generally, the thread pitch of the upper threaded portion is smaller than the thread pitch of the lower threaded portion.

The head of the screw is provided with an upper surface and a lower surface. The lower surface of the head, that is, the surface facing the shaft, may be provided with an annular recess. The annular recess provides a region of open volume to trap remnants that may be extruded as the screw enters the material. As the head of the screw comes into close proximity with the material, the annular recess traps exiting remnants in the region of open volume. The annular recess is preferably curved inwardly with a profile in the shape of a semi-oval. The annular recess may also be shaped to have a profile of a notch, a cone, or any suitable shape providing a region of open volume to trap loose remnants.

The upper surface of the screw head may be provided with a recess fitted to receive a driving tool. The recess is preferably formed as a recessed square. The recess may also be formed for accepting various other driving tools, including a phillips head and flat-head screw driver.

Upon insertion of the screw into material, the upper threaded portion having a smaller minor diameter, or inner thread diameter, than the minor diameter, or inner thread diameter, of lower threaded portion allows more room in the annulus between the thread markings made in the material by the threads of the first or lower portion and the minor diameter of the upper threaded portion for remnants or otherwise displaced material to be stored within the hole below the surface of the workpiece. Thus, the invention will reduce, if not eliminate, remnants on the surface and mushrooming.

DETAILED DESCRIPTION OF THE INVENTION

Figure 1:
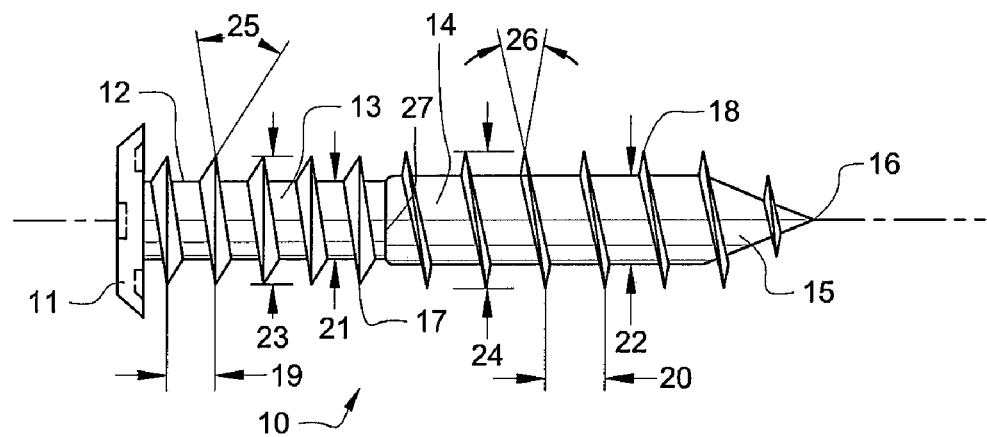
FIG. 1 is an elevation view of an embodiment of the present invention.
Figure 2:
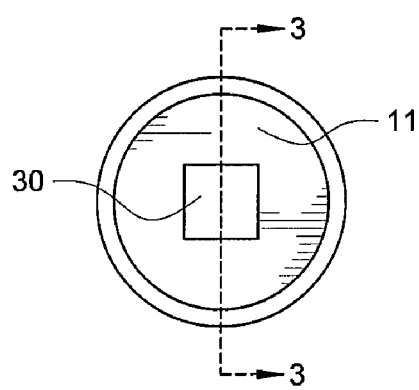
FIG. 2 is an end view of an embodiment of the present invention.

FIG. 1 shows a screw 10 according to a preferred embodiment of the present invention. The screw 10 includes a head 11 and a shaft 12. The shaft 12 includes a tapered distal end 15 having a tip 16.

The shaft 12 includes an upper threaded portion 13 that is closest to the head 11 and a lower threaded portion 14. The upper threaded portion 13 has a first shaft diameter 21, and the lower threaded portion 13 has a second shaft diameter 22 that is greater than the first shaft diameter 21. The first shaft diameter 21 is also known as the minor thread diameter of upper portion 13. Similarly, the second shaft diameter 22 is also known as the minor thread diameter of lower portion 14. Thus, the cross-sectional area of the shaft within the lower threaded portion 14 is greater than the cross-sectional area of the shaft within the upper threaded portion. In operation, the smaller shaft diameter 21 of upper threaded portion 13 allows more room for remnants to remain in the screw hole as the shaft advances into the workpiece thus reducing mushrooming and unwanted surface remnants.

Figure 4:
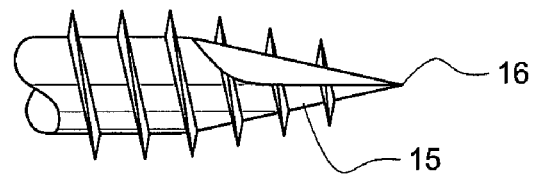
FIG. 4 is a detailed view of the tip suited for use on a screw of the present invention.

Referring to FIGS. 1 and 4, tip 16 is provided with a sharp point to facilitate boring through the material. In a preferred embodiment, the tip is a sharp gimlet tip as shown in FIG. 4, but the tip may also be a conventional screw tip.

Referring still to FIG. 1, lower threaded portion 14 is provided with threads 18 that start at or near tip 16 and continue up to the intersection 27 of lower threaded portion 14 and upper threaded portion 13. Threads 18 on the tapered distal end 15 and tip 16 may be manufactured to be self-tapping threads.

Upper threaded portion 13 having threads 17 may be juxtaposed with the lower threaded portion 14. In a preferred embodiment, threads 17 continue toward head 11 and stop at or near the intersection of upper threaded portion 13 and head 11.

Threads 17 of upper threaded portion 13 have a first outer diameter 23 and a first thread pitch 19 that is defined by the axial distance from a point on a thread (usually on the crest of a thread) to a corresponding point on an adjacent thread. The threads 18 of the lower threaded portion 14 have a second outer diameter 24 and a second thread pitch 20. Second outer diameter 24 is greater than first outer diameter 23. In the illustrated embodiment, the second thread pitch 20 of the lower threaded portion 14 is greater than the first thread pitch 19 of the upper threaded portion 13. However, the second thread pitch 20 may be equal to or smaller than the first thread pitch 19.

Threads 17 of the upper threaded portion 13 have a first thread angle 25 defined by the exterior surfaces of thread 17. Threads 18 of the lower threaded portion 14 have a second thread angle 26 also defined by the exterior surfaces of thread 18. In the present invention, second thread angle 26 is preferably less than first thread angle 25. This further serves the purpose of providing the invention with the ability to retain remnants adjacent upper threaded portion 13.

Figure 3A:
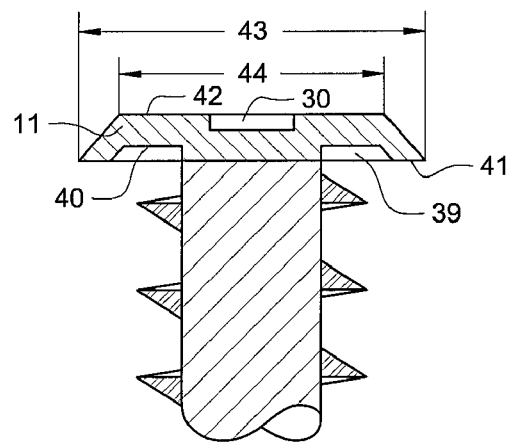
FIGS. 3A-3E are various cross-sectional views of a screw head configuration that can be used in the present invention taken generally along line 3-3 of FIG. 2.
Figure 3B:
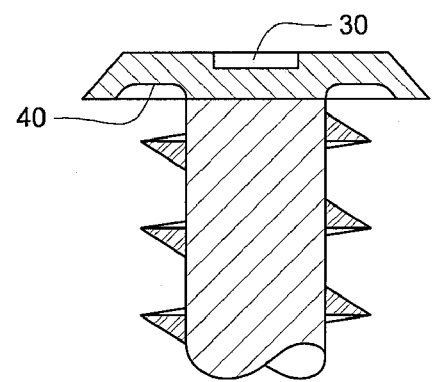
Figure 3C:
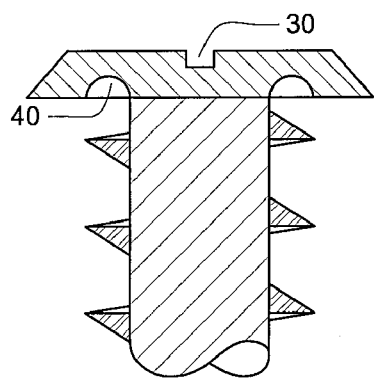
Figure 3D:
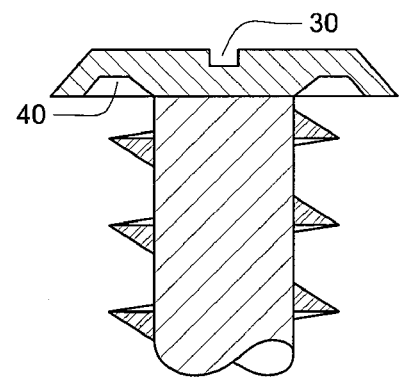
Figure 3E:
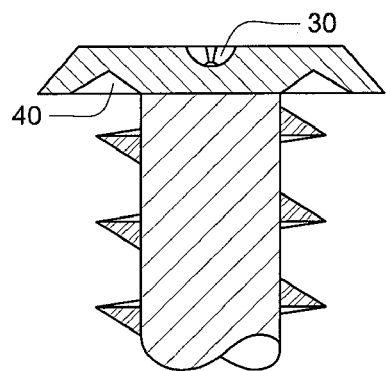

Referring now to FIGS. 1 and 3A, head 11 has a first head diameter 43 and a second head diameter 44. First head diameter 43 is preferably larger than second head diameter 44, but other embodiments are possible. Preferably, first head diameter 43 is greater than second outer thread diameter 24 of lower threaded portion 14. Head 11 has an upper surface 42 and a lower surface 41. Lower surface 41 is substantially parallel to upper surface 42 and includes an annular recess 40. Annular recess 40 provides a region of open volume 39 to trap additional remnants that may be extruded as the screw enters the material or workpieces. As screw 10 enters the material and head 11 comes into close proximity with the material, annular recess 40 traps exiting remnants in the region of open volume 39. Annular recess 40 may be curved inwardly with a profile in the shape of a semi-oval as shown in FIG. 3B. Referring to FIGS. 3C-3E, annular recess 40 may also be shaped to have a profile of a notch, a cone, or any suitable shape providing a region of open volume to trap loose remnants as long as the head maintains structural integrity under working conditions.

Referring now to FIGS. 2 and 3A-E, upper surface 42 of head 11 is provided with a recessed opening 30 for receiving a driving tool that can be used to drive the screw into the material. Recessed opening 30 is preferably formed as a recessed square. The recessed opening 30 may also be formed for accepting various other driving tools, including a phillips and flat-head screw driver.

Screws 12 may be manufactured from extruded blanks or as otherwise well known to those skilled in the art in view of this disclosure. The screws can be made of carbon steel or an other suitable material used in making composite screws. The screws may be coated with a zinc plating and a coating of a top coat that matches the color of the surface in which the screw will be installed.

While this invention has been described in relation to composite lumber, one skilled in the art will appreciate that this invention has application to securing other products and construction materials. While this invention has been described in terms of preferred embodiments, the invention is not intended to be limited to the above embodiments or drawings. Any modifications, or alternatives which come within the spirit and scope of the following claims is to be considered part of the present invention.

What is claimed is:

1. A fastener comprising:
   a head;
   a shaft having a first and second end, said head being affixed to the shaft at the first end of the shaft and the second end of the shaft having a point;
   said shaft having an upper threaded portion and a lower threaded portion, the upper threaded portion being closer to the head end than the lower threaded section;
   said upper threaded portion having a first shaft diameter, the lower threaded portion having a second shaft diameter, wherein the first shaft diameter is less than the second shaft diameter;
   said head having an outer diameter greater than the outer thread diameter of the upper threaded portion and the lower threaded portion; and
   said upper threaded portion having a first thread angle and said lower threaded portion having a second thread angle, wherein the first thread angle is greater than the second thread angle.

2. The fastener of claim 1 wherein said upper threaded portion extends along said shaft from said head to said lower threaded portion.

3. The fastener of claim 1 wherein said upper threaded portion is juxtaposed said lower threaded portion.

4. The fastener of claim 1 wherein said upper threaded portion has a first outer thread diameter and said lower threaded portion has a second outer thread diameter, wherein said first outer thread diameter is less than said second outer thread diameter.

5. The fastener of claim 1 wherein said upper threaded portion has a first thread pitch and said lower threaded portion has a second thread pitch, wherein said first thread pitch is less than said second thread pitch.

6. The fastener of claim 1 wherein the point is a self tapping tip.

7. The fastener of claim 1 wherein the point is a gimlet tip.

8. The fastener of claim 1 wherein the head is provided with a top surface having a recess to receive a driving tool and a bottom surface having an annular ridge.

9. The screw of claim 8 wherein said recess comprises a square opening.

10. The fastener of claim 8 wherein said recess comprises a slot.

11. The fastener of claim 8 wherein said annular ridge has a v-shaped cross-section.

12. The fastener of claim 8 wherein said annular ridge has a semi-oval cross-section.

13. A fastener comprising:

a head;

a shaft having a first and second end, said head being affixed to the shaft at the first end of the shaft and the second end of the shaft having a point;

said shaft having an upper threaded portion and a lower threaded portion, the upper threaded portion being closer to the head end than the lower threaded section;

said upper threaded portion having a first shaft diameter and a first thread angle, said lower threaded portion having a second shaft diameter and a second thread angle, wherein the first shaft diameter is less than the second shaft diameter and said first thread angle is greater than said second thread angle; and said head is provided with a top surface having a recess to receive a driving tool and a bottom surface having an annular ridge.

14. The fastener of claim 13 wherein said upper threaded portion extends along said shaft from said head to said lower threaded portion.

15. The fastener of claim 13 wherein said upper threaded portion is juxtaposed said lower threaded portion.

16. The fastener of claim 13 wherein said upper threaded portion has a first outer thread diameter and said lower threaded portion has a second outer thread diameter, wherein said first outer thread diameter is less than said second outer thread diameter.

17. The fastener of claim 13 wherein said upper threaded portion has a first thread pitch and said lower threaded portion has a second thread pitch, wherein said first thread pitch is less than said second thread pitch.

18. A screw comprising:

a head;

a shaft having a first end and a second end, said head being affixed to the shaft at the first end of the shaft and the second end of the shaft having a point;

the shaft having an upper threaded portion and a lower threaded portion, the upper threaded portion being closer to the head end than the lower threaded section;

said upper threaded portion having a first shaft diameter, a first thread angle and a first outer thread diameter, said lower threaded portion having a second shaft diameter, a second thread angle and a second outer thread diameter, wherein said first shaft diameter is less than the second shaft diameter, said first thread angle is greater than said second thread angle, and said first outer thread diameter is less than said second outer thread diameter; and said head is provided with a top surface having a recess to receive a driving tool and a bottom surface having an annular ridge.

\* \* \* \* \*

UNITED STATES PATENT AND TRADEMARK OFFICE
CERTIFICATE OF CORRECTION

| | | |
|---|---|---|
| PATENT NO. | : 7,255,523 B2 | Page 1 of 1 |
| APPLICATION NO. | : 11/315985 | |
| DATED | : August 14, 2007 | |
| INVENTOR(S) | : Cyril Laan | |

It is certified that error appears in the above-identified patent and that said Letters Patent is hereby corrected as shown below:

Title page, item [57]

In the third sentence of the Abstract, delete the portion reading "an upper threaded portion and an upper threaded portion." and insert therefor --an upper threaded portion and a lower threaded portion.--.

Signed and Sealed this

Twenty-third Day of October, 2007

JON W. DUDAS
*Director of the United States Patent and Trademark Office*